United States Patent
Gibbons et al.

(10) Patent No.: US 9,142,233 B1
(45) Date of Patent: Sep. 22, 2015

(54) HEAT ASSISTED MAGNETIC RECORDING WRITER HAVING A RECESSED POLE

(71) Applicant: Western Digital (Fremont), LLC, Fremont, CA (US)

(72) Inventors: Matthew R. Gibbons, San Jose, CA (US); Hongxing Yuan, San Ramon, CA (US); Brad V. Johnson, Santa Clara, CA (US); Michael V. Morelli, San Jose, CA (US); Lisha Wang, Fremont, CA (US); Zhigang Bai, Fremont, CA (US); Ge Yi, San Ramon, CA (US); Yunfei Li, Fremont, CA (US); Samuel W. Yuan, Saratoga, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/297,975

(22) Filed: Jun. 6, 2014

Related U.S. Application Data (60) Provisional application No. 61/946,512, filed on Feb. 28, 2014.

(51) Int. Cl.
  *G11B 13/08* (2006.01)
  *G11B 5/48* (2006.01)
  (Continued)

(52) U.S. Cl.
  CPC .......... *G11B 5/4866* (2013.01); *G11B 5/00826* (2013.01); *G11B 13/08* (2013.01); *G11B 5/187* (2013.01); *G11B 2005/0021* (2013.01); *G11B 2005/0029* (2013.01)

(58) Field of Classification Search
  CPC ............... G11B 2005/0021; G11B 2005/0029; G11B 5/4866; G11B 13/08; G11B 13/04; G11B 5/00826; G11B 5/187

USPC .......... 369/13.17, 13.22, 13.23, 13.24, 13.32, 369/13.12, 13.33; 360/59, 110, 123.01, 360/123.05, 125.04, 125.74

See application file for complete search history.

(56) References Cited

U.S. PATENT DOCUMENTS

| | | | |
|---|---|---|---|
| 4,743,083 A | 5/1988 | Schimpe | |
| 5,173,909 A | 12/1992 | Sakano et al. | |

(Continued)

FOREIGN PATENT DOCUMENTS

| | | |
|---|---|---|
| EP | 1498878 A2 | 1/2005 |
| EP | 1501076 A1 | 1/2005 |

OTHER PUBLICATIONS

Chubing Peng, "Surface-plasmon resonance of a planar lollipop near-field transducer", Applied Physics Letters 94, 171106 (2009), 3 pages.

(Continued)

*Primary Examiner* — Thomas Alunkal (57) ABSTRACT

A heat assisted magnetic recording (HAMR) write transducer has an air-bearing surface (ABS) configured to reside in proximity to a media during use and is coupled with a laser that provides energy. The HAMR transducer includes a main pole, at least one additional pole adjacent to the main pole in a down track direction, a waveguide and at least one coil for energizing the main pole. The main pole is configured to write to a region of the media and is recessed from the ABS by a first distance. The additional pole(s) are recessed from the ABS by a second distance greater than the first distance. The waveguide is optically coupled with the laser and directs a portion of the energy toward the ABS at an acute angle from the ABS. A portion of the waveguide resides between the additional pole(s) and the ABS.

28 Claims, 5 Drawing Sheets

(51) Int. Cl.
  *G11B 5/008* (2006.01)
  *G11B 5/00* (2006.01)
  *G11B 5/187* (2006.01)

(56) References Cited

U.S. PATENT DOCUMENTS

| | | | |
|---|---|---|---|
| 5,199,090 A | 3/1993 | Bell | |
| 5,341,391 A | 8/1994 | Ishimura | |
| 5,625,729 A | 4/1997 | Brown | |
| 5,960,014 A | 9/1999 | Li et al. | |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |
| 6,094,803 A | 8/2000 | Carlson et al. | |
| 6,099,362 A | 8/2000 | Viches et al. | |
| 6,103,073 A | 8/2000 | Thayamballi | |
| 6,108,166 A | 8/2000 | Lederman | |
| 6,118,629 A | 9/2000 | Huai et al. | |
| 6,118,638 A | 9/2000 | Knapp et al. | |
| 6,125,018 A | 9/2000 | Takagishi et al. | |
| 6,130,779 A | 10/2000 | Carlson et al. | |
| 6,134,089 A | 10/2000 | Barr et al. | |
| 6,136,166 A | 10/2000 | Shen et al. | |
| 6,137,661 A | 10/2000 | Shi et al. | |
| 6,137,662 A | 10/2000 | Huai et al. | |
| 6,160,684 A | 12/2000 | Heist et al. | |
| 6,163,426 A | 12/2000 | Nepela et al. | |
| 6,166,891 A | 12/2000 | Lederman et al. | |
| 6,173,486 B1 | 1/2001 | Hsiao et al. | |
| 6,175,476 B1 | 1/2001 | Huai et al. | |
| 6,178,066 B1 | 1/2001 | Barr | |
| 6,178,070 B1 | 1/2001 | Hong et al. | |
| 6,178,150 B1 | 1/2001 | Davis | |
| 6,181,485 B1 | 1/2001 | He | |
| 6,181,525 B1 | 1/2001 | Carlson | |
| 6,185,051 B1 | 2/2001 | Chen et al. | |
| 6,185,063 B1 | 2/2001 | Cameron | |
| 6,185,077 B1 | 2/2001 | Tong et al. | |
| 6,185,081 B1 | 2/2001 | Simion et al. | |
| 6,188,549 B1 | 2/2001 | Wiitala | |
| 6,190,764 B1 | 2/2001 | Shi et al. | |
| 6,193,584 B1 | 2/2001 | Rudy et al. | |
| 6,195,229 B1 | 2/2001 | Shen et al. | |
| 6,198,608 B1 | 3/2001 | Hong et al. | |
| 6,198,609 B1 | 3/2001 | Barr et al. | |
| 6,201,673 B1 | 3/2001 | Rottmayer et al. | |
| 6,204,998 B1 | 3/2001 | Katz | |
| 6,204,999 B1 | 3/2001 | Crue et al. | |
| 6,212,153 B1 | 4/2001 | Chen et al. | |
| 6,215,625 B1 | 4/2001 | Carlson | |
| 6,219,205 B1 | 4/2001 | Yuan et al. | |
| 6,221,218 B1 | 4/2001 | Shi et al. | |
| 6,222,707 B1 | 4/2001 | Huai et al. | |
| 6,229,782 B1 | 5/2001 | Wang et al. | |
| 6,230,959 B1 | 5/2001 | Heist et al. | |
| 6,233,116 B1 | 5/2001 | Chen et al. | |
| 6,233,125 B1 | 5/2001 | Knapp et al. | |
| 6,237,215 B1 | 5/2001 | Hunsaker et al. | |
| 6,252,743 B1 | 6/2001 | Bozorgi | |
| 6,255,721 B1 | 7/2001 | Roberts | |
| 6,258,468 B1 | 7/2001 | Mahvan et al. | |
| 6,266,216 B1 | 7/2001 | Hikami et al. | |
| 6,271,604 B1 | 8/2001 | Frank, Jr. et al. | |
| 6,275,354 B1 | 8/2001 | Huai et al. | |
| 6,275,453 B1 | 8/2001 | Ueyanagi et al. | |
| 6,277,505 B1 | 8/2001 | Shi et al. | |
| 6,282,056 B1 | 8/2001 | Feng et al. | |
| 6,296,955 B1 | 10/2001 | Hossain et al. | |
| 6,297,955 B1 | 10/2001 | Frank, Jr. et al. | |
| 6,304,414 B1 | 10/2001 | Crue, Jr. et al. | |
| 6,307,715 B1 | 10/2001 | Berding et al. | |
| 6,310,746 B1 | 10/2001 | Hawwa et al. | |
| 6,310,750 B1 | 10/2001 | Hawwa et al. | |
| 6,317,290 B1 | 11/2001 | Wang et al. | |
| 6,317,297 B1 | 11/2001 | Tong et al. | |
| 6,322,911 B1 | 11/2001 | Fukagawa et al. | |
| 6,330,136 B1 | 12/2001 | Wang et al. | |
| 6,330,137 B1 | 12/2001 | Knapp et al. | |
| 6,333,830 B2 | 12/2001 | Rose et al. | |
| 6,340,533 B1 | 1/2002 | Ueno et al. | |
| 6,349,014 B1 | 2/2002 | Crue, Jr. et al. | |
| 6,351,355 B1 | 2/2002 | Min et al. | |
| 6,353,318 B1 | 3/2002 | Sin et al. | |
| 6,353,511 B1 | 3/2002 | Shi et al. | |
| 6,356,412 B1 | 3/2002 | Levi et al. | |
| 6,359,779 B1 | 3/2002 | Frank, Jr. et al. | |
| 6,369,983 B1 | 4/2002 | Hong | |
| 6,376,964 B1 | 4/2002 | Young et al. | |
| 6,377,535 B1 | 4/2002 | Chen et al. | |
| 6,381,095 B1 | 4/2002 | Sin et al. | |
| 6,381,105 B1 | 4/2002 | Huai et al. | |
| 6,389,499 B1 | 5/2002 | Frank, Jr. et al. | |
| 6,392,850 B1 | 5/2002 | Tong et al. | |
| 6,396,660 B1 | 5/2002 | Jensen et al. | |
| 6,399,179 B1 | 6/2002 | Hanrahan et al. | |
| 6,400,526 B2 | 6/2002 | Crue, Jr. et al. | |
| 6,404,600 B1 | 6/2002 | Hawwa et al. | |
| 6,404,601 B1 | 6/2002 | Rottmayer et al. | |
| 6,404,706 B1 | 6/2002 | Stovall et al. | |
| 6,410,170 B1 | 6/2002 | Chen et al. | |
| 6,411,522 B1 | 6/2002 | Frank, Jr. et al. | |
| 6,417,998 B1 | 7/2002 | Crue, Jr. et al. | |
| 6,417,999 B1 | 7/2002 | Knapp et al. | |
| 6,418,000 B1 | 7/2002 | Gibbons et al. | |
| 6,418,048 B1 | 7/2002 | Sin et al. | |
| 6,421,211 B1 | 7/2002 | Hawwa et al. | |
| 6,421,212 B1 | 7/2002 | Gibbons et al. | |
| 6,424,505 B1 | 7/2002 | Lam et al. | |
| 6,424,507 B1 | 7/2002 | Lederman et al. | |
| 6,430,009 B1 | 8/2002 | Komaki et al. | |
| 6,430,806 B1 | 8/2002 | Chen et al. | |
| 6,433,965 B1 | 8/2002 | Gopinathan et al. | |
| 6,433,968 B1 | 8/2002 | Shi et al. | |
| 6,433,970 B1 | 8/2002 | Knapp et al. | |
| 6,437,945 B1 | 8/2002 | Hawwa et al. | |
| 6,445,536 B1 | 9/2002 | Rudy et al. | |
| 6,445,542 B1 | 9/2002 | Levi et al. | |
| 6,445,553 B2 | 9/2002 | Barr et al. | |
| 6,445,554 B1 | 9/2002 | Dong et al. | |
| 6,447,935 B1 | 9/2002 | Zhang et al. | |
| 6,448,765 B1 | 9/2002 | Chen et al. | |
| 6,451,514 B1 | 9/2002 | Iitsuka | |
| 6,452,742 B1 | 9/2002 | Crue et al. | |
| 6,452,765 B1 | 9/2002 | Mahvan et al. | |
| 6,456,465 B1 | 9/2002 | Louis et al. | |
| 6,459,552 B1 | 10/2002 | Liu et al. | |
| 6,462,920 B1 | 10/2002 | Karimi | |
| 6,466,401 B1 | 10/2002 | Hong et al. | |
| 6,466,402 B1 | 10/2002 | Crue, Jr. et al. | |
| 6,466,404 B1 | 10/2002 | Crue, Jr. et al. | |
| 6,468,436 B1 | 10/2002 | Shi et al. | |
| 6,469,877 B1 | 10/2002 | Knapp et al. | |
| 6,477,019 B2 | 11/2002 | Matono et al. | |
| 6,479,096 B1 | 11/2002 | Shi et al. | |
| 6,483,662 B1 | 11/2002 | Thomas et al. | |
| 6,487,040 B1 | 11/2002 | Hsiao et al. | |
| 6,487,056 B1 | 11/2002 | Gibbons et al. | |
| 6,490,125 B1 | 12/2002 | Barr | |
| 6,496,330 B1 | 12/2002 | Crue, Jr. et al. | |
| 6,496,334 B1 | 12/2002 | Pang et al. | |
| 6,504,676 B1 | 1/2003 | Hiner et al. | |
| 6,512,657 B2 | 1/2003 | Heist et al. | |

(56) References Cited

U.S. PATENT DOCUMENTS

| | | |
|---|---|---|
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,671,127 B2 | 12/2003 | Hsu et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,195 B2 | 2/2004 | Miyanishi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,795,630 B2 | 9/2004 | Challener et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,834,027 B1 | 12/2004 | Sakaguchi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,930,975 B2 | 8/2005 | Tawa et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,967,810 B2 | 11/2005 | Kasiraj et al. |
| 6,969,989 B1 | 11/2005 | Mei |
| 6,975,486 B2 | 12/2005 | Chen et al. |
| 6,975,580 B2 | 12/2005 | Rettner et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,027,700 B2 | 4/2006 | Challener |
| 7,035,046 B1 | 4/2006 | Young et al. |
| 7,041,985 B1 | 5/2006 | Wang et al. |
| 7,042,810 B2 | 5/2006 | Akiyama et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,082,007 B2 | 7/2006 | Liu et al. |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,230 B2 * | 11/2006 | Saga et al. ............... 360/59 |
| 7,133,241 B2 | 11/2006 | Che et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,171,080 B1 | 1/2007 | Rausch |
| 7,177,117 B1 | 2/2007 | Jiang et al. |
| 7,190,539 B1 | 3/2007 | Nibarger |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |

(56) References Cited

U.S. PATENT DOCUMENTS

| | | |
|---|---|---|
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,266,268 B2 | 9/2007 | Challener et al. |
| 7,272,079 B2 | 9/2007 | Challener |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,330,404 B2 | 2/2008 | Peng et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,656 B2 | 5/2008 | Satoh et al. |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,394,607 B2 | 7/2008 | Ohno et al. |
| 7,408,731 B2 | 8/2008 | Uemura et al. |
| 7,417,813 B2 | 8/2008 | Lim et al. |
| 7,417,821 B2 | 8/2008 | Tsuchinaga |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,440,221 B2 | 10/2008 | Tsuchinaga et al. |
| 7,440,660 B1 | 10/2008 | Jin et al. |
| 7,443,625 B2 | 10/2008 | Hamaguchi et al. |
| 7,443,632 B1 | 10/2008 | Stoev et al. |
| 7,444,740 B1 | 11/2008 | Chung et al. |
| 7,486,460 B2 | 2/2009 | Tsuchinaga et al. |
| 7,486,709 B2 | 2/2009 | Hu et al. |
| 7,490,212 B2 | 2/2009 | Kasiraj et al. |
| 7,492,804 B2 | 2/2009 | Tawa |
| 7,493,688 B1 | 2/2009 | Wang et al. |
| 7,500,255 B2 | 3/2009 | Seigler et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,567,387 B2 | 7/2009 | Itagi et al. |
| 7,580,602 B2 | 8/2009 | Itagi et al. |
| 7,583,466 B2 | 9/2009 | Kermiche et al. |
| 7,595,967 B1 | 9/2009 | Moon et al. |
| 7,596,072 B2 | 9/2009 | Buechel et al. |
| 7,596,295 B2 | 9/2009 | Hasegawa |
| 7,639,457 B1 | 12/2009 | Chen et al. |
| 7,649,677 B2 | 1/2010 | Jin et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,791,839 B2 | 9/2010 | Olson et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,839,497 B1 | 11/2010 | Rausch et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,880,996 B2 | 2/2011 | Stipe |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,031,561 B2 | 10/2011 | Hellwig et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,169,881 B2 | 5/2012 | Balamane et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |

(56) References Cited

U.S. PATENT DOCUMENTS

| | | | |
|---|---|---|---|
| 8,227,023 B1 | 7/2012 | Liu et al. |
| 8,228,633 B1 | 7/2012 | Tran et al. |
| 8,228,779 B2 | 7/2012 | Peng et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,264,919 B2 | 9/2012 | Komura et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 * | 12/2012 | Yi et al. ............... 29/603.14 |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,416,646 B2 | 4/2013 | Huang et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,555 B2 | 5/2013 | Seigler et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,619,535 B2 | 12/2013 | Balamane et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,630,517 B2 | 1/2014 | Okayama |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 * | 3/2014 | Shi et al. ............... 369/13.24 |
| 8,670,295 B1 | 3/2014 | Hu et al. |
| 8,675,318 B1 | 3/2014 | Ho et al. |

(56) References Cited

U.S. PATENT DOCUMENTS

| | | | |
|---|---|---|---|
| 8,675,455 B1 | 3/2014 | Krichevsky et al. | |
| 8,681,594 B1 | 3/2014 | Shi et al. | |
| 8,689,430 B1 | 4/2014 | Chen et al. | |
| 8,693,141 B1 | 4/2014 | Elliott et al. | |
| 8,703,397 B1 | 4/2014 | Zeng et al. | |
| 8,705,205 B1 | 4/2014 | Li et al. | |
| 8,711,518 B1 | 4/2014 | Zeng et al. | |
| 8,711,528 B1 | 4/2014 | Xiao et al. | |
| 8,717,709 B1 | 5/2014 | Shi et al. | |
| 8,720,044 B1 | 5/2014 | Tran et al. | |
| 8,721,902 B1 | 5/2014 | Wang et al. | |
| 8,724,259 B1 | 5/2014 | Liu et al. | |
| 8,749,790 B1 | 6/2014 | Tanner et al. | |
| 8,749,920 B1 | 6/2014 | Knutson et al. | |
| 8,753,903 B1 | 6/2014 | Tanner et al. | |
| 8,760,807 B1 | 6/2014 | Zhang et al. | |
| 8,760,818 B1 | 6/2014 | Diao et al. | |
| 8,760,819 B1 | 6/2014 | Liu et al. | |
| 8,760,822 B1 | 6/2014 | Li et al. | |
| 8,760,823 B1 | 6/2014 | Chen et al. | |
| 8,763,235 B1 | 7/2014 | Wang et al. | |
| 8,780,498 B1 | 7/2014 | Jiang et al. | |
| 8,780,505 B1 | 7/2014 | Xiao | |
| 8,786,983 B1 | 7/2014 | Liu et al. | |
| 8,790,524 B1 | 7/2014 | Luo et al. | |
| 8,790,527 B1 | 7/2014 | Luo et al. | |
| 8,792,208 B1 | 7/2014 | Liu et al. | |
| 8,792,312 B1 | 7/2014 | Wang et al. | |
| 8,793,866 B1 | 8/2014 | Zhang et al. | |
| 8,797,680 B1 | 8/2014 | Luo et al. | |
| 8,797,684 B1 | 8/2014 | Tran et al. | |
| 8,797,686 B1 | 8/2014 | Bai et al. | |
| 8,797,692 B1 | 8/2014 | Guo et al. | |
| 8,813,324 B2 | 8/2014 | Emley et al. | |
| 8,947,985 B1 * | 2/2015 | Morelli et al. | 369/13.33 |
| 2001/0006435 A1 | 7/2001 | Ichihara et al. | |
| 2001/0017820 A1 | 8/2001 | Akiyama et al. | |
| 2003/0039443 A1 | 2/2003 | Catchmark et al. | |
| 2003/0184903 A1 | 10/2003 | Challener | |
| 2003/0198146 A1 | 10/2003 | Rottmayer et al. | |
| 2004/0001394 A1 | 1/2004 | Challener et al. | |
| 2004/0001420 A1 | 1/2004 | Challener | |
| 2004/0008943 A1 | 1/2004 | Berini | |
| 2004/0027728 A1 | 2/2004 | Coffey et al. | |
| 2004/0223249 A1 | 11/2004 | Kang et al. | |
| 2004/0228022 A1 | 11/2004 | Ueyanagi | |
| 2005/0047013 A1 | 3/2005 | Le et al. | |
| 2005/0069298 A1 | 3/2005 | Kasiraj et al. | |
| 2005/0071537 A1 | 3/2005 | New et al. | |
| 2005/0078565 A1 | 4/2005 | Peng et al. | |
| 2005/0122850 A1 | 6/2005 | Challener et al. | |
| 2005/0157393 A1 | 7/2005 | Hasegawa et al. | |
| 2005/0157595 A1 | 7/2005 | Tawa et al. | |
| 2005/0289576 A1 | 12/2005 | Challener | |
| 2006/0232874 A1 | 10/2006 | Tsuchinaga et al. | |
| 2007/0030588 A1 | 2/2007 | Tsuchinaga et al. | |
| 2007/0081426 A1 | 4/2007 | Lee et al. | |
| 2007/0081427 A1 | 4/2007 | Suh et al. | |
| 2007/0223132 A1 | 9/2007 | Tsuchinaga | |
| 2008/0002529 A1 | 1/2008 | Sekine et al. | |
| 2008/0049563 A1 | 2/2008 | Konno et al. | |
| 2008/0055343 A1 | 3/2008 | Cho et al. | |
| 2008/0180827 A1 | 7/2008 | Zhu et al. | |
| 2008/0181560 A1 | 7/2008 | Suh et al. | |
| 2008/0198496 A1 | 8/2008 | Shimazawa et al. | |
| 2008/0204916 A1 | 8/2008 | Matsumoto et al. | |
| 2008/0232225 A1 | 9/2008 | Cho et al. | |
| 2009/0073858 A1 * | 3/2009 | Seigler et al. | 369/112.27 |
| 2010/0020431 A1 | 1/2010 | Shimazawa et al. | |
| 2010/0046331 A1 * | 2/2010 | Takayama et al. | 369/13.33 |
| 2010/0165500 A1 * | 7/2010 | Suzuki et al. | 360/59 |
| 2010/0290157 A1 | 11/2010 | Zhang et al. | |
| 2011/0086240 A1 | 4/2011 | Xiang et al. | |
| 2011/0128828 A1 * | 6/2011 | Naniwa et al. | 369/13.23 |
| 2011/0205866 A1 | 8/2011 | Osawa et al. | |
| 2011/0228651 A1 | 9/2011 | Gage et al. | |
| 2011/0228652 A1 | 9/2011 | Gage et al. | |
| 2011/0235480 A1 | 9/2011 | Goulakov et al. | |
| 2012/0020195 A1 | 1/2012 | Seigler | |
| 2012/0039155 A1 | 2/2012 | Peng et al. | |
| 2012/0082016 A1 | 4/2012 | Komura et al. | |
| 2012/0084969 A1 | 4/2012 | Tanaka et al. | |
| 2012/0111826 A1 | 5/2012 | Chen et al. | |
| 2012/0113770 A1 | 5/2012 | Stipe | |
| 2012/0216378 A1 | 8/2012 | Emley et al. | |
| 2012/0237878 A1 | 9/2012 | Zeng et al. | |
| 2012/0298621 A1 | 11/2012 | Gao | |
| 2013/0133182 A1 | 5/2013 | Bonhote et al. | |
| 2013/0216702 A1 | 8/2013 | Kaiser et al. | |
| 2013/0216863 A1 | 8/2013 | Li et al. | |
| 2013/0257421 A1 | 10/2013 | Shang et al. | |
| 2014/0133283 A1 | 5/2014 | Maletzky et al. | |
| 2014/0154529 A1 | 6/2014 | Yang et al. | |
| 2014/0175050 A1 | 6/2014 | Zhang et al. | |

OTHER PUBLICATIONS

Y.P. Rakovich, et al., "Photonic Nanojets in Coupled Microcavities", European Conference on Lasers and Electro-Optics 2009 and the European Quantum Electronics Conference (CLEO Europe—EQEC 2009), Munich, Jun. 14-19, 2009, IEEE, pp. 5191625.

Galan, et al., "Horizontal slot waveguide-based efficient fiber couplers suitable for silicon photonics", Eindhoven, The Netherlands, pp. 237-240, Jun. 2008.

William A. Challener, "Minitarure planar solid immersion mirror with focused spot less than a quarter wavelength", Optics Express, vol. 13. No. 18, Sep. 5, 2005, 9 pages.

Robert E. Rottmayer, "Heat-Assisted Magnetic Recording", IEEEE Transactions on Magentics, vol. 42, No. 10, Oct. 2006, 5 pages.

Michael A. Seigler, "Integrated Heat Assisted Magnetic Recording Head: Design and Recording Demonstration", IEEE Transactions on Magnetics, vol. 44. No. 1, Jan. 2008, 6 pages.

Alexander Krichevsky, et. al., U.S. Appl. No. 13/927,996, filed Jun. 26, 2013, 30 pages.

Zhong Shi, et. al., U.S. Appl. No. 13/919,494, filed Jun. 17, 2013, 21 pages.

Zhong Shi, et. al., U.S. Appl. No. 13/797,268, filed Mar. 12, 2013, 21 pages.

Michael V. Morelli, et al., U.S. Appl. No. 14/034,487, filed Sep. 23, 2013, 24 pages.

* cited by examiner

HEAT ASSISTED MAGNETIC RECORDING WRITER HAVING A RECESSED POLE

CROSS-REFERENCE TO RELATED APPLICATIONS

This application claims priority to provisional U.S. Patent Application Ser. No. 61/946,512, filed on Feb. 28, 2014, which is hereby incorporated by reference in its entirety.

BACKGROUND

Figure 1A:
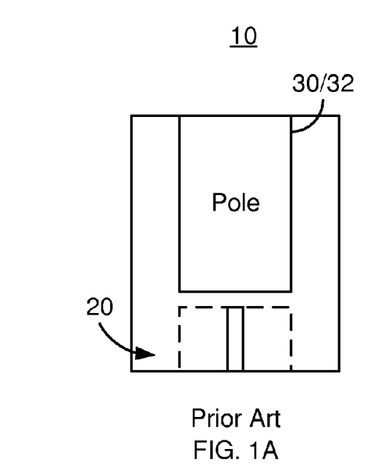
FIGS. 1A and 1B depict side and plan views of a conventional heat assisted magnetic recording head.
Figure 1B:
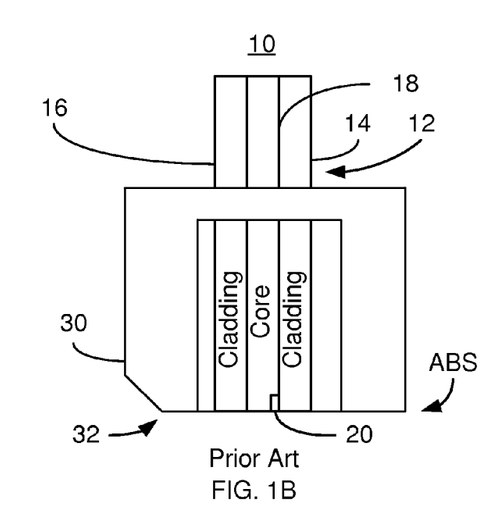

FIGS. 1A and 1B depict ABS and side views of a portion of a conventional heat assisted magnetic recording (HAMR) transducer 10. For clarity, FIGS. 1A and 1B are not to scale. The conventional HAMR transducer 10 is used in writing a recording media (not shown in FIGS. 1A-1B) and receives light, or energy, from a conventional laser (not shown in FIGS. 1A-1B). The conventional HAMR transducer 10 includes a conventional waveguide 12 having cladding 14 and 16 and core 18, a conventional near-field transducer (NFT) 20, and a conventional pole 30. The conventional pole 30 includes a pole tip 32 having a surface that is at the air-bearing surface (ABS). Light from a laser (not shown) is incident on and coupled into the waveguide 12. Light is guided by the conventional waveguide 12 to the NFT 20 near the ABS. The NFT 20 focuses the light to magnetic recording media (not shown), such as a disk. This region is thus heated. The write pole 30 is energized and field from the pole tip 32 is used to write to the heated portion of the recording media.

Although the conventional HAMR transducer 10 functions, there are drawbacks. In particular, integration of the magnetic portions of the transducer 10 with the optical portions of the HAMR transducer 10 may be challenging. For example, the field from the conventional pole tip 32 at the media may not be in the direction desired. In some cases, the field, which is desired to be close to perpendicular to the ABS, may be almost parallel to the ABS at the recording media. In addition, the magnetic field from the pole 30 may impact the performance the optical components 12 and/or 20. As a result, the performance of the conventional HAMR transducer 10 may be adversely affected.

DETAILED DESCRIPTION OF THE PREFERRED EMBODIMENTS

Figure 2:
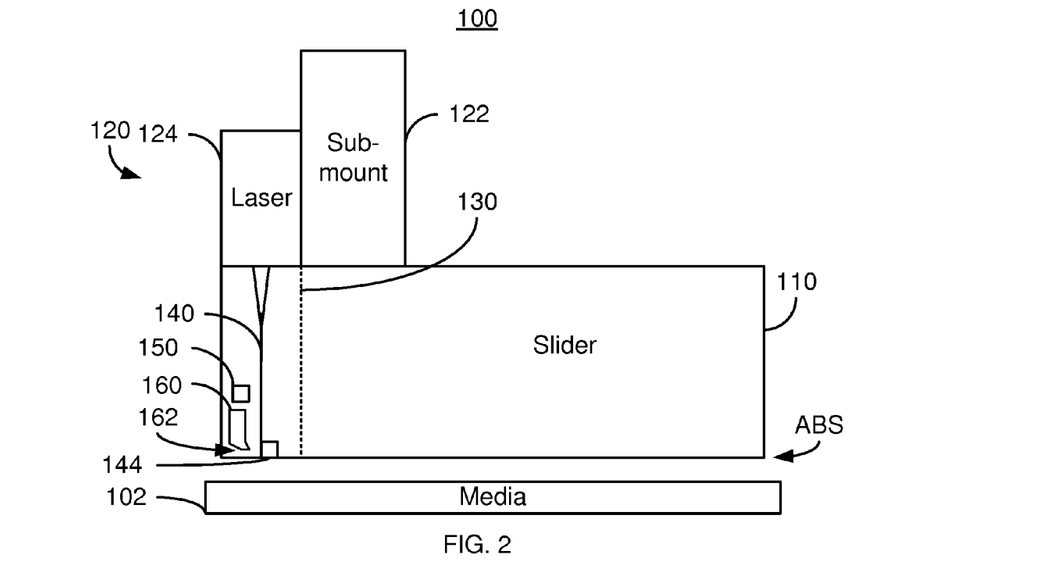
FIG. 2 is a diagram depicting a side view of an exemplary embodiment of a HAMR disk drive.

FIG. 2 depicts a side view of an exemplary embodiment of a portion of a heat-assisted magnetic recording (HAMR) disk drive 100. For clarity, FIG. 2 is not to scale. For simplicity not all portions of the HAMR disk drive 100 are shown. In addition, although the HAMR disk drive 100 is depicted in the context of particular components other and/or different components may be used. For example, circuitry used to drive and control various portions of the HAMR disk drive 100 is not shown. For simplicity, only single components are shown. However, multiples of each component and their sub-components, might be used.

The HAMR disk drive 100 includes media 102, a slider 110, a laser subassembly 120 and a HAMR head 130. Additional and/or different components may be included in the HAMR disk drive 100. Although not shown, the slider 110, and thus the laser assembly 120 and HAMR transducer 130 are generally attached to a suspension (not shown). The laser assembly 120 includes a submount 122 and a laser 124. The submount 122 is a substrate to which the laser 124 may be affixed for improved mechanical stability, ease of manufacturing and better robustness. The laser 124 may be a chip such as a laser diode or other laser.

The HAMR transducer 130 is fabricated on the slider 110 and includes an air-bearing surface (ABS) proximate to the media 102 during use. In general, the HAMR write transducer 130 and a read transducer are present in the HAMR head. However, for clarity, only the HAMR write transducer 130 is shown. As can be seen in FIG. 2, HAMR transducer 140 includes a waveguide 140, coil(s) 150, a near-field transducer (NFT) 144 and a main pole 160. The waveguide 140 is optically coupled with the laser 124 and carries light energy from the laser 124 to the ABS. Although not explicitly shown in FIG. 2, the waveguide 140 directs the energy at an acute angle from the ABS. The NFT 144 couples a portion of this energy from the waveguide 140 to the media 102.

The main pole 160 is recessed from the ABS. In some embodiments, the main pole 160 is recessed a distance greater than zero and not more than one hundred twenty nanometers from the ABS. in some such embodiments, the HAMR transducer is recessed by at least fifty nanometers and not more than seventy nanometers. The main pole 160 includes an ABS facing surface. The main pole also has a leading surface closer to the NFT 144 and a trailing surface opposite to the leading surface. The leading surface includes a leading bevel (not labeled in FIG. 2) at a leading bevel angle from a direction perpendicular to the ABS (the stripe height direction). The trailing surface includes a trailing bevel 162 at a trailing bevel angle from the stripe height direction. The leading bevel angle and trailing bevel angle may be the same direction (e.g. both counterclockwise) from the stripe height direction. In other embodiments, the leading bevel angle and trailing bevel angle may be different directions from the stripe height direction (e.g. one clockwise, the other counterclockwise). In some embodiments, the leading bevel angle is smaller than the trailing bevel angle. Thus, as can be seen in FIG. 2, the main pole 160 is taller further from the ABS.

The HAMR disk drive 100 may exhibit improved performance. More specifically, the recessed main pole 160 may improve performance of the writer 130. Because the main pole 160 is recessed from the ABS, there may be greater space between the main pole 160 and optical components such as the NFT 144 and/or waveguide 140. Interference in operation of the optical components by the magnetic field generated by the main pole 160 may be reduced. Optical performance of the HAMR transducer 130 may thus be improved. Further, the location of the main pole 160 may allow for a field that has the desired angle with the media 102. In some embodiments, for example, the write field may be closer to perpendicular to the media 102/ABS. The magnitude of the magnetic field may be increased, for example by the volume of magnetic material in the pole 160. The magnetic field may be further enhanced if the turns of the coils 150 on opposite sides of the main pole 160 carry current in opposite directions. Thus, performance and reliability of the HAMR transducer 130 and the disk drive 100 may be enhanced.

Figure 3A:
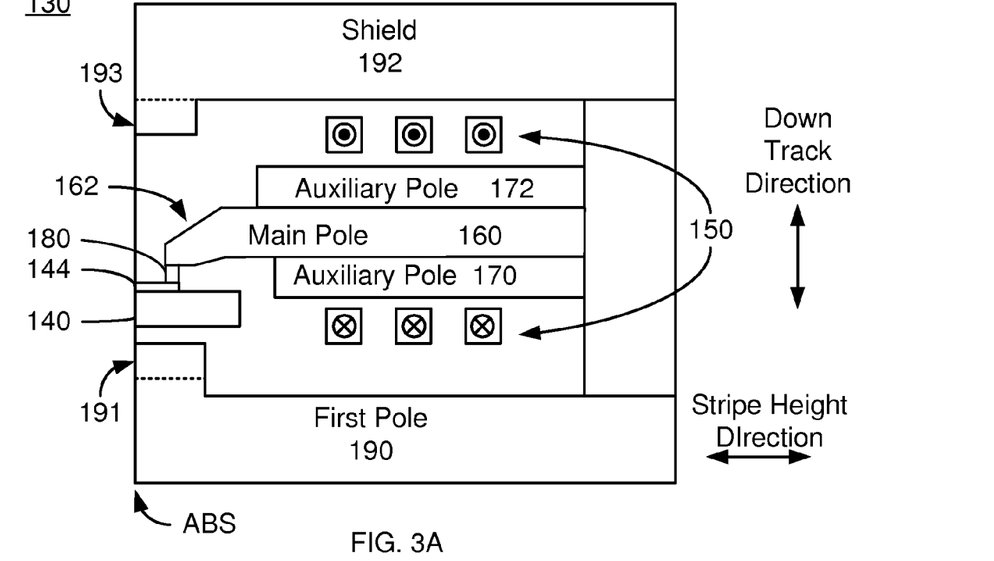
FIGS. 3A, 3B and 3C are diagrams depicting side views and a plan view of an exemplary embodiment of a portion of a HAMR write transducer.
Figure 3B:
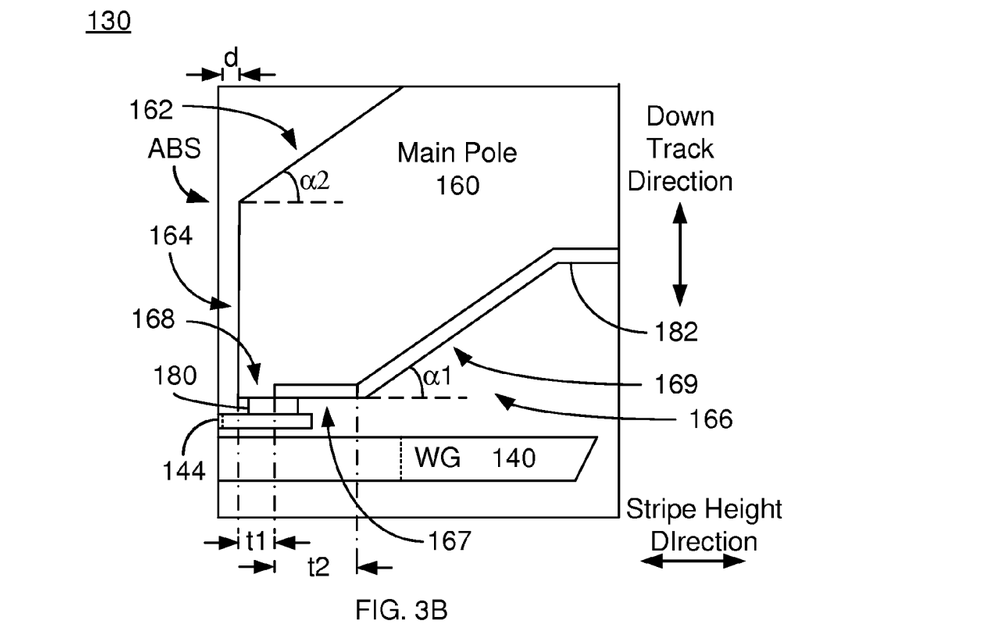
Figure 3C:
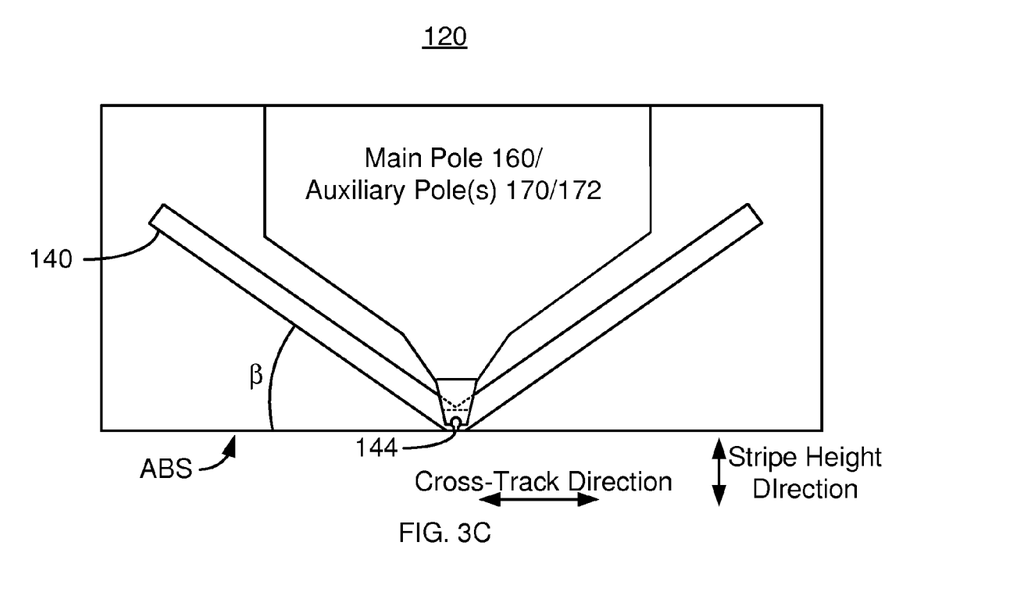

FIGS. 3A-3C depict an exemplary embodiment of a portion of the HAMR disk drive 100. More specifically, FIGS. 3A and 3B are side views of an exemplary embodiment of a portion the HAMR disk drive 100. A side view of a portion of the transducer 130 is shown in FIG. 3A, while a close-up view near the pole tip is depicted in FIG. 3B. FIG. 3C depicts a plan view of a portion of the HAMR transducer 130. For clarity, FIGS. 3A-3C are not to scale. Referring to FIGS. 2-3C, for simplicity not all portions of the HAMR transducer 130 are shown. In addition, although the disk drive 100 and HAMR transducer 130 is depicted in the context of particular components other and/or different components may be used. For example, circuitry used to drive and control various portions of the HAMR transducer 130 is not shown. For simplicity, only single components are shown. However, multiples of one or more of the components and/or and their sub-components, might be used.

The HAMR transducer 130 depicted in FIGS. 3A-3C is analogous to the transducer 130 depicted in FIG. 2. Consequently, analogous components are labeled similarly. The HAMR transducer 130 includes a waveguide 140, near-field transducer (NFT) 144, coil(s) 150 and write pole 160. FIG. 3A also depicts auxiliary poles 170 and 172, heat sink 180, first pole/shield 190, as well as shield 192. FIG. 3B also depicts a heat spreader 182. The pole 190, shield 192 and auxiliary poles 170 and 172 are magnetic. The auxiliary pole 170 and 172 are also recessed from the ABS further than the main pole 160. In contrast, pole 190 and shield 192 have surfaces at the ABS. In the embodiment shown, the first pole 190 and shield 192 each include pedestal portions 191 and 193, respectively. However, in other embodiments, the components 190 and 192 may be configured differently or omitted. In other embodiments, different and/or additional components may be used in the HAMR transducer 130.

The waveguide 140 is optically coupled with the laser 134 and guides light energy from the laser 134 toward the ABS. In the embodiment shown the waveguide 140 directs the energy from the laser to the NFT 144. Note that for simplicity, FIGS. 3A-3C depict only a portion of the waveguide 140 at the ABS. As can be seen, the waveguide 140 is configured to direct the energy toward the ABS at an acute angle, β, from the ABS. For example, the waveguide 140 may be an interferometric waveguide that includes a plurality of arms. Typically, there are two arms. The energy from the laser 134 is split between the arms of the waveguide 140 and directed toward the ABS at the acute angle. An interference pattern from the light is formed at the ABS in the region of the NFT 144. It is the arms of the waveguide 140 that may be considered to form the acute angle with the ABS. In such embodiments, the waveguide 140 may be formed and guide the light around the main pole 160.

The NFT 144 resides at or near the ABS and utilizes local resonances in surface plasmons to focus the light to magnetic recording media 102. At resonance, the NFT 144 couples the optical energy of the surface plasmons efficiently into the recording medium layer of the media 102 with a confined optical spot which is much smaller than the optical diffraction limit. This optical spot can rapidly heat the recording medium layer to near or above the Curie point. High density bits can be written on a high coercivity medium with the pole 160 energized by the coils 150 to a modest magnetic field.

The coils 150 may form a single helical coil or may be portions of two pancake coils. In some embodiments, a single pancake coil may be used instead of two. Further, although depicted as a single layer, multiple layers may be used for the coils 150. In some embodiments, two layers are present for the coil 150. As discussed above, a current driven through the coils 150 may energize the main pole 160 to provide a magnetic write field. In the embodiment shown in FIG. 3A, the coils 150 on one side of the main pole 160 carry current in a different direction than the coils in the opposite side of the main pole 160. For example, in the embodiment shown, coils on one side (leading edge) of the main pole 160 in the down track direction may carry current into the page, while the coils 150 on the opposite side (trailing edge) of the main pole 160 in the down track direction may carry current out of the plane of the page. As a result, the magnetic field generated by the coils 150 may be additive in the region of the main pole 160. However, in other embodiments, other current direction(s) may be used.

The main, or write, pole 160 includes a trailing (top) surface 162 that includes a trailing bevel 162, an ABS facing surface 164, and a leading surface 166. The leading surface 166 includes an NFT-facing surface 167 and a leading bevel 169. The NFT-facing surface 167 includes a portion 168 that is closer to the ABS and to the NFT 144 than the remaining portion of the NFT-facing surface 167. In some embodiments, the first portion 168 of the NFT-facing surface 167 extends, a distance t1, from an ABS facing surface to at least ninety nanometers and not more than one hundred fifty nanometers from the ABS. The remaining portion of the NFT-facing surface 167 extends a distance t2 from at least ninety and not more than one hundred fifty nanometers from the ABS to at least three hundred fifty nanometers and not more than five hundred nanometers from the ABS. In the embodiment shown in FIG. 2, the leading bevel and the trailing bevel 162 adjoin the ABS-facing surface 162. In FIGS. 3A-3C, however, the trailing bevel 162 adjoins the ABS-facing surface, but the leading bevel 169 does not. Instead, the NFT facing surface 167 is between the ABS-facing surface 164 and the leading bevel 169. In FIG. 3A, the main pole 160 is shown as extending to the back gap, the same distance as the auxiliary poles 170 and 172 extend from the ABS. However, in other embodiments, the main pole 160 may extend a different distance from the ABS. For example, the auxiliary pole(s) 170 and/or 172 may physically contact the back gap, while the main pole 160 does not. Thus, the auxiliary pole(s) 170 and/or 172 may extend further from the ABS than the main pole 160 does. In addition, in some embodiments, the main pole 160 may include a nonmagnetic insertion layer between a front portion closer to the ABS and a rear portion contacting the back gap.

The leading bevel 169 is at a leading bevel angle, α1, from a direction perpendicular to the ABS (the stripe height direction). Similarly, the trailing bevel 162 is at a trailing bevel angle, α2, from the stripe height direction. The trailing bevel 162 and leading bevel 169 may be configured such that the main pole 160 is thicker from a distance from the ABS. For example, the leading bevel angle may be less than the trailing bevel angle (α1<α2). For example, in some embodiments, the leading bevel angle is at least twenty-five degrees and not more than forty-five degrees and the trailing bevel is at least forty degrees and not more than sixty degrees.

The main pole 160 is recessed a distance, d, from the ABS but is still configured to write to the media 102. For example, d may be greater than zero nanometers and not more than one hundred twenty nanometers. In some embodiments, the main pole 160 is at least fifty nanometers and not more than seventy nanometers from the ABS. In the embodiment shown in FIGS. 3A-3C, the NFT 144 extends further from the ABS than the main pole 160 is recessed from the ABS. In such embodiments, the main pole 160 may be considered to overlap a portion of the NFT 144 in the down track direction. However, in other embodiments, the NFT 144 may extend as far as or less far from the ABS than the main pole 160 is recessed from the ABS. The main pole 160 also generally overlaps the waveguide 140 in the down track direction. Stated differently, the waveguide 140 may extend further from the ABS than the main pole 160 is recessed from the ABS.

FIGS. 3A-3C also depicts an auxiliary poles 170 and 172. An ABS facing surface of each of the auxiliary poles 170 and 172 is located closest to the ABS in FIGS. 3A-3C. In the embodiment shown, the auxiliary pole 172 is closer to the ABS than the auxiliary pole 170. However, in other embodiments, the auxiliary poles 170 and 172 may be the same distance from the ABS or the auxiliary pole 170 may be closer to the ABS than the auxiliary pole 172. As can be seen in FIG. 3A, the auxiliary poles 170 and 172 are in the down track direction from the main pole 160. The auxiliary poles 170 and 172 are also each shown as adjoining, or sharing an interface with, the main pole 160. However, in other embodiments, another layer may separate the main pole 160 from the auxiliary pole(s) 170 and/or 172. As discussed above, the auxiliary poles 170 and 172 are recessed further form the ABS than the main pole 164 is. In addition, the auxiliary pole 170 is recessed from the ABS by a distance greater than or equal to the width of the waveguide 140. Thus, there is space between the auxiliary pole 170 and the ABS through which the waveguide 140 may fit. In the embodiment shown, the auxiliary pole 170 is recessed further from the ABS than the width of the waveguide 140.

Also depicted in FIG. 3B are a heat sink 180 and a heat spreader 182. The heat sink 180 is thermally connected to the NFT 144 and to the NFT-facing surface 167 of the main pole 160. More specifically, the heat sink may be physically connected to the NFT 144 and the first portion 168 of the NFT-facing surface of the main pole 160. The remaining portion of the NFT-facing surface 167 of the main pole 160 is physically and thermally connected with the heat spreader 182. In the embodiment shown, the head spreader 182 resides along a large portion of the leading surface 166 of the main pole 160. For example, in the embodiment shown, the heat spreader 182 extends not only along the remaining portion of the NFT-facing surface 167 but also along the leading bevel 169 and beyond. The heat spreader 182 may transfer heat from the NFT 144 to a larger portion of the main pole 160.

In operation, the laser 134 emits light that is provided to the waveguide 140. The waveguide 140 directs the light to the NFT 144. As discussed above, a portion of the waveguide 140 directs light at an acute angle, β (depicted in FIG. 3C) from the ABS in the region near the ABS. The NFT 144 focuses the light to a region of magnetic recording media 102 using surface plasmons. The NFT 144 thus couples the optical energy of the light into the recording medium layer of the media 102 with a confined optical spot. This optical spot can typically heat the recording medium layer above the Curie point on the sub-nanosecond scale. Write current(s) are driven through the coils 150 to energize the main pole 160. High density bits can be written on a high coercivity medium using the write pole 160 energized by the coils 150 to a lower magnetic write field than would be possible in the absence of heating of the media 102.

The HAMR disk drive 100 may exhibit improved performance. More specifically, the recessed main pole 160 may improve performance of the writer 130. Because the main pole 160 is recessed from the ABS, there may be greater space between the main pole 160 and optical components such as the NFT 144 and/or waveguide 140. Interference in operation of the optical components by the magnetic field generated by the main pole 160 may be reduced. Optical performance of the HAMR transducer 130 may thus be improved. Further, the location of the main pole 160 may allow for a field that has the desired angle with the media 102. In some embodiments, for example, the write field may be closer to perpendicular to the media 102/ABS. The magnetic field may be further enhanced if the turns of the coils 150 on opposite sides of the main pole 160 carry current in opposite directions. The heat sink 180 and heat spreader 182 may also improve thermal management of the transducer 130. Thus, damage to the NFT 144 may be prevented and reliability of the transducer 130 improved. The configuration of the bevel angles α1 and α2 may also allow for the thickness (height in the down track direction) of the main pole 160 to be increased away from the ABS. Thus, performance and reliability of the HAMR transducer 130 and the disk drive 100 may be enhanced.

Figure 4:
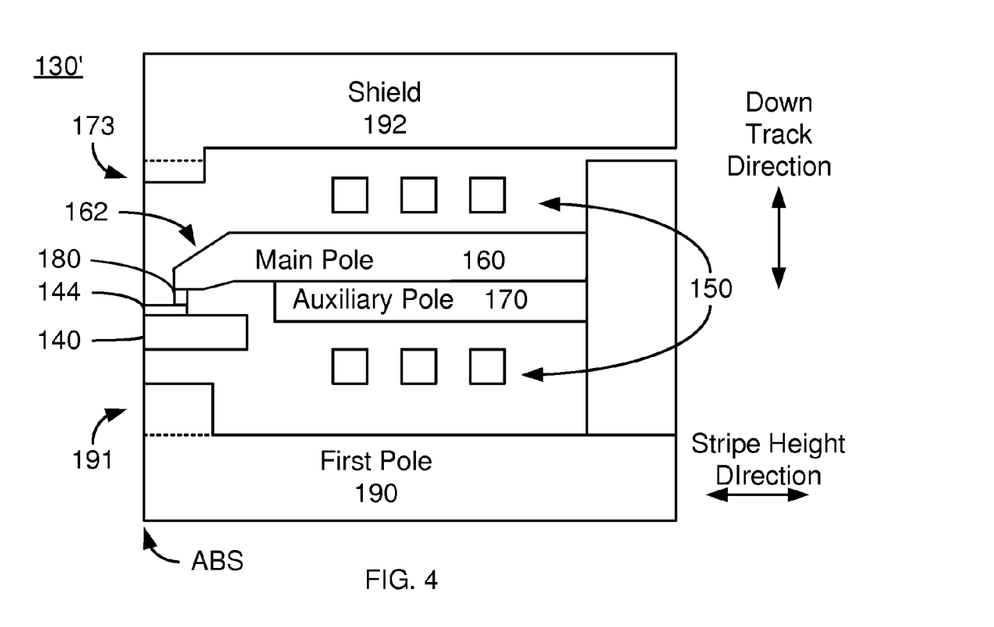
FIG. 4 is a diagram depicting a side view of another exemplary embodiment of a portion of a HAMR write transducer.

FIG. 4 depicts a side view of another exemplary embodiment of a portion of a HAMR transducer 130'. For clarity, FIG. 4 is not to scale. For simplicity not all portions of the HAMR transducer 130' are shown. The HAMR transducer 130' is analogous to the HAMR transducer 130. Consequently, analogous components have similar labels. Further, the HAMR transducer 130' may be used in the HAMR disk drive 100.

Referring to FIGS. 2 and 4, the HAMR transducer 130' includes a waveguide 140, an NFT 144, coils 150, main pole 160, auxiliary pole 170, heat sink 180, first pole 190 having pedestal 191 and shield 192 having pedestal 193 that are analogous to the waveguide 140, NFT 144, coils 150, main pole 160, auxiliary pole 170, heat sink 180, first pole 190 having pedestal 191 and shield 192 having pedestal 193, respectively. The main pole 160 is still recessed from the ABS in a manner analogous to the HAMR transducer 130. Further, although not shown, the HAMR transducer 130' may include a spreader analogous to the heat spreader 182. In addition, for simplicity, only the trailing bevel 162 is labeled. However, the main pole 160 includes an ABS-facing surface, an NFT-facing surface, a leading surface and a leading bevel analogous to the ABS-facing surface 164, the NFT-facing surface 167, the leading surface 166, and the leading bevel 169. In some embodiments, the NFT-facing surface of the main pole 160 in the HAMR transducer 130' may include a first portion that is closer to the NFT than the second portion. In other embodiments, the NFT-facing surface may be omitted.

In the embodiment shown in FIG. 4, the auxiliary pole 172 has been omitted. The direction in which current travels in the coils 150 is also omitted. In some embodiments, turns on one side of the main pole 160 (e.g. the leading side) carry current in the opposite direction from turns on the opposite side of the main pole 160 (e.g. the trailing side). In other embodiments, other current direction(s) are possible. However, the HAMR transducer 130' may function in an analogous HAMR transducer 130. The HAMR transducer 130' may thus share the benefits of the HAMR transducer 130 and the HAMR disk drive 100. Recessing the main pole 160 may improve the optical and/or magnetic performance of the writer 130'. The magnetic field may be further enhanced if the turns of the coils 150 on opposite sides of the main pole 160 carry current in opposite directions. The heat management may be improved by the inclusion of the heat sink 180 and/or a heat spreader. Thus, performance and reliability of the HAMR transducer 130' and the disk drive 100 may be enhanced.

Figure 5:
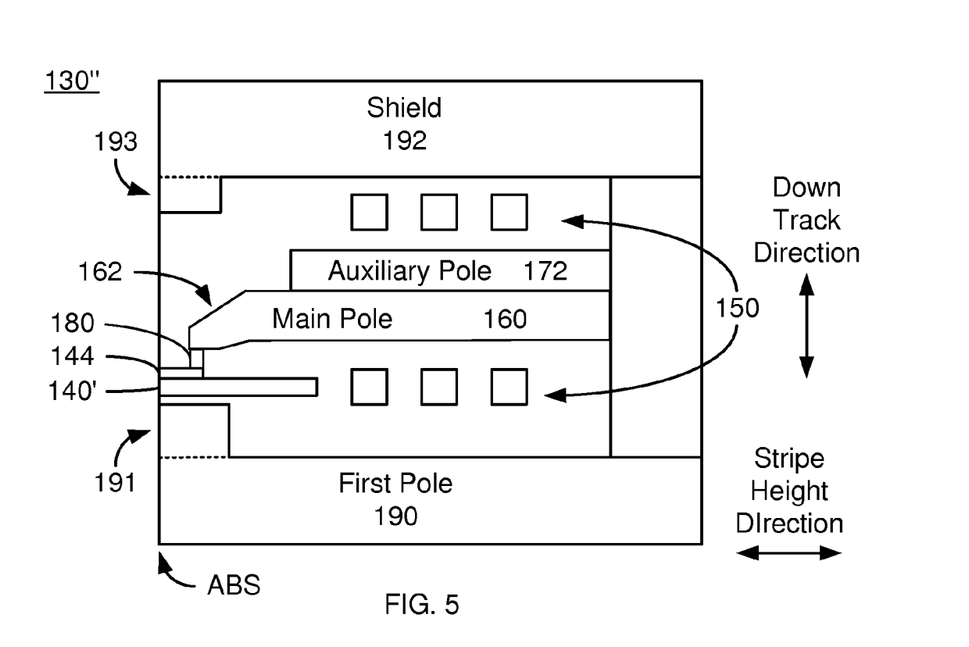
FIG. 5 is a diagram depicting a side view of another exemplary embodiment of a portion of a HAMR write transducer.

FIG. 5 depicts a side view of another exemplary embodiment of a portion of a HAMR transducer 130". For clarity, FIG. 5 is not to scale. For simplicity not all portions of the HAMR transducer 130" are shown. The HAMR transducer 130" is analogous to the HAMR transducer(s) 130 and/or 130'. Consequently, analogous components have similar labels. Further, the HAMR transducer 130" may be used in the HAMR disk drive 100.

Referring to FIGS. 2 and 5, the HAMR transducer 130" includes a waveguide 140, an NFT 144, coils 150, main pole 160, auxiliary pole 172, heat sink 180, first pole 190 having pedestal 191 and shield 192 having pedestal 193 that are analogous to the waveguide 140, NFT 144, coils 150, main pole 160, auxiliary pole 172, heat sink 180, first pole 190 having pedestal 191 and shield 192 having pedestal 193, respectively. The main pole 160 is still recessed from the ABS in a manner analogous to the HAMR transducer 130/130'. Further, although not shown, the HAMR transducer 130" may include a heat spreader analogous to the heat spreader 182. In addition, for simplicity, only the trailing bevel 162 is labeled. However, the main pole 160 includes an ABS-facing surface, an NFT-facing surface, a leading surface and a leading bevel analogous to the ABS-facing surface 164, the NFT-facing surface 167, the leading surface 166, and the leading bevel 169. In some embodiments, the NFT-facing surface of the main pole 160 in the HAMR transducer 130" may include a first portion that is closer to the NFT than the second portion. In other embodiments, the NFT-facing surface may be omitted.

In the embodiment shown in FIG. 5, the auxiliary pole 170 has been omitted. In addition, the direction of current is not shown. In some embodiments, the turns on one side of the main pole 160 carry current in the opposite direction from turns on the other side of the main pole 160. In other embodiments, other current direction(s) are possible. However, the HAMR transducer 130" may function in an analogous HAMR transducer 130/130'. The HAMR transducer 130" may thus share the benefits of the HAMR transducer 130/130' and the HAMR disk drive 100. Recessing the main pole 160 may improve the optical and/or magnetic performance of the writer 130". The magnetic field may be further enhanced if the turns of the coils 150 on opposite sides of the main pole 160 carry current in opposite directions. The heat management may be improved by the inclusion of the heat sink 180 and/or a heat spreader. Thus, performance and reliability of the HAMR transducer 130" and the disk drive 100 may be enhanced.

Figure 6:
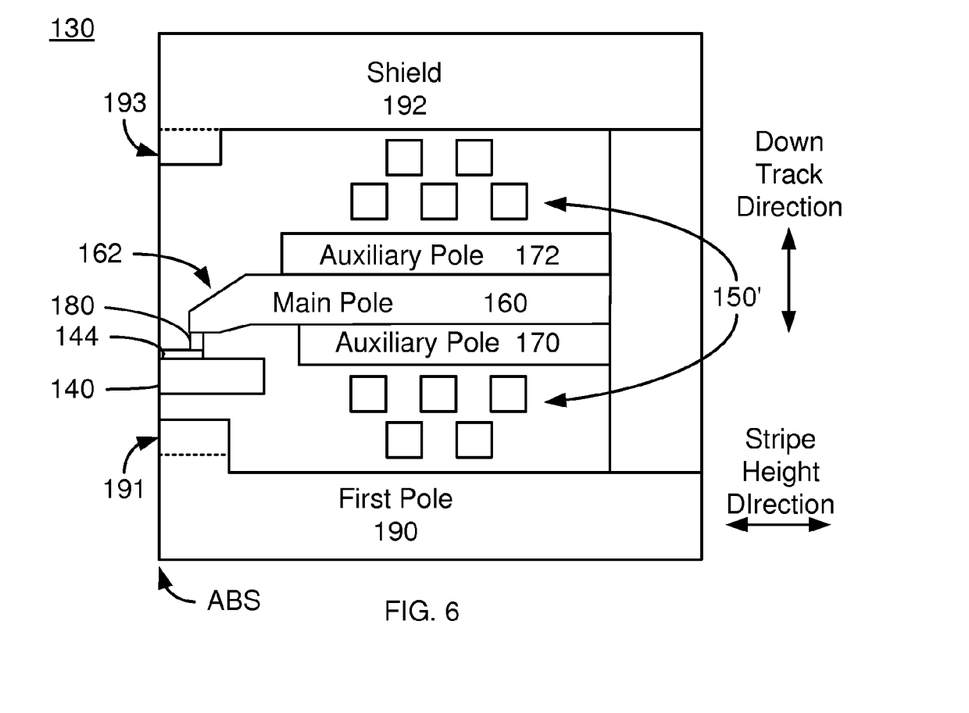
FIG. 6 is a diagram depicting a side view of another exemplary embodiment of a portion of a HAMR write transducer.

FIG. 6 depicts a side view of another exemplary embodiment of a portion of a HAMR transducer 130'''. For clarity, FIG. 6 is not to scale. For simplicity not all portions of the HAMR transducer 130''' are shown. The HAMR transducer 130''' is analogous to the HAMR transducer(s) 130, 130' and/or 130". Consequently, analogous components have similar labels. Further, the HAMR transducer 130" may be used in the HAMR disk drive 100.

Referring to FIGS. 2 and 6, the HAMR transducer 130" includes a waveguide 140, an NFT 144, coils 150', main pole 160, auxiliary poles 170 and 172, heat sink 180, first pole 190 having pedestal 191 and shield 192 having pedestal 193 that are analogous to the waveguide 140, NFT 144, coils 150, main pole 160, auxiliary poles 170 and 172, heat sink 180, first pole 190 having pedestal 191 and shield 192 having pedestal 193, respectively. The main pole 160 is still recessed from the ABS in a manner analogous to the HAMR transducer 130/130'. Further, although not shown, the HAMR transducer 130''' may include a heat spreader analogous to the heat spreader 182. In addition, for simplicity, only the trailing bevel 162 is labeled. However, the main pole 160 includes an ABS-facing surface, an NFT-facing surface, a leading surface and a leading bevel analogous to the ABS-facing surface 164, the NFT-facing surface 167, the leading surface 166, and the leading bevel 169. In some embodiments, the NFT-facing surface of the main pole 160 in the HAMR transducer 130''' may include a first portion that is closer to the NFT than the second portion. In other embodiments, the NFT-facing surface may be omitted.

In the embodiment shown in FIG. 6, the coils 150' include two layers of coils. In addition, the direction of current is not shown. In some embodiments, the turns on one side of the main pole 160 carry current in the opposite direction from turns on the other side of the main pole 160. In other embodiments, current may be carried in other direction(s). However, the HAMR transducer 130''' may function in an analogous HAMR transducer 130/130'/130". The HAMR transducer 130''' may thus share the benefits of the HAMR transducer 130/130'/130" and the HAMR disk drive 100. Recessing the main pole 160 may improve the optical and/or magnetic performance of the writer 130'''. The magnetic field may be further enhanced if the turns of the coils 150 on opposite sides of the main pole 160 carry current in opposite directions. The heat management may be improved by the inclusion of the heat sink 180 and/or a heat spreader. Thus, performance and reliability of the HAMR transducer 130''' and the disk drive 100 may be enhanced.

Figure 7:
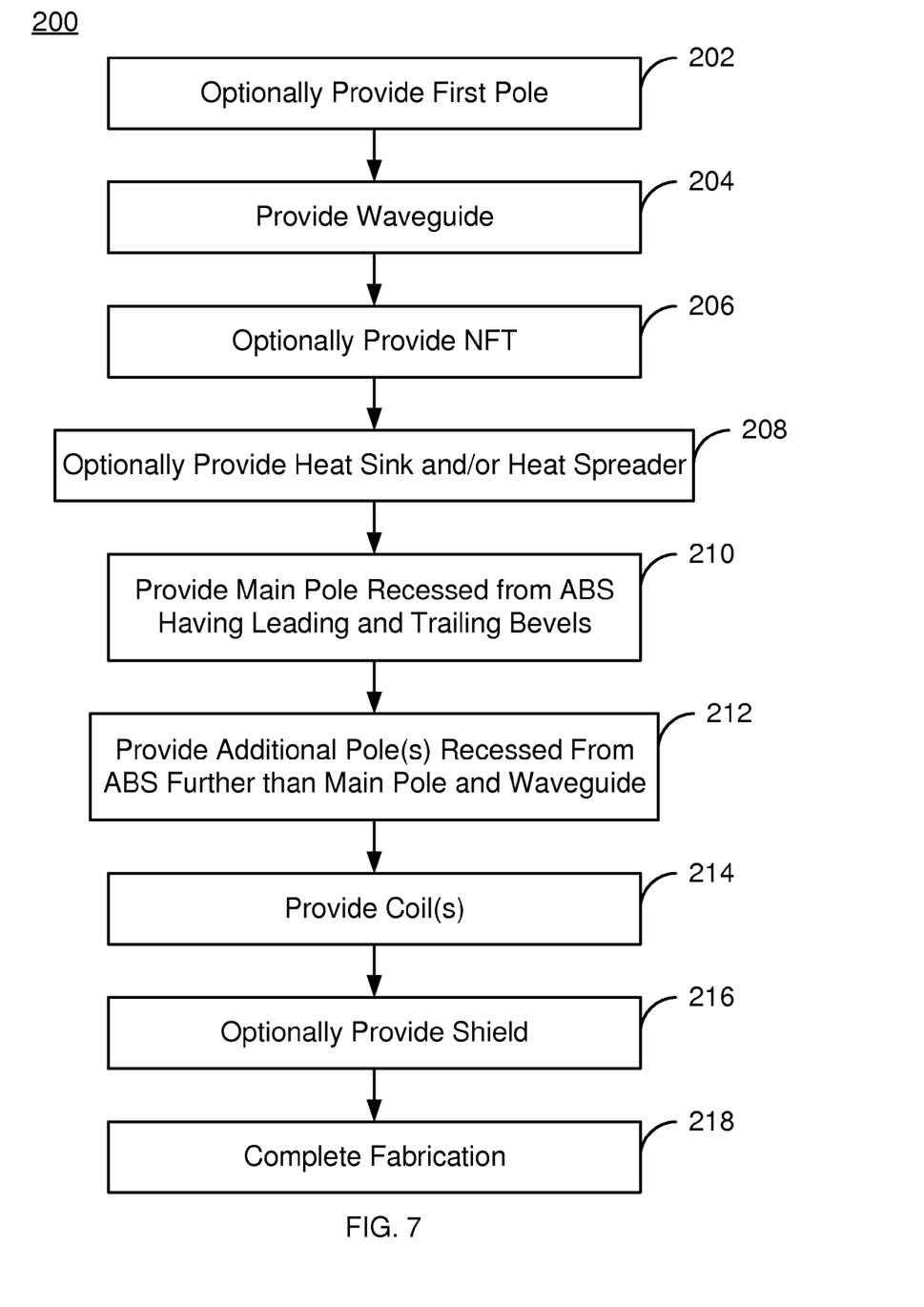
FIG. 7 is a flow chart depicting an exemplary embodiment of a method for fabricating a HAMR write transducer.

FIG. 7 is a flow chart depicting an exemplary embodiment of a method 200 for fabricating a HAMR write transducer. The method 200 may be used in fabricating transducers such as the transducers 130, 130', 130" and/or 130''', though other transducers might be so fabricated. For clarity, the method 200 is described in the context of the transducer 130 depicted in FIGS. 2-3C. For simplicity, some steps may be omitted, performed in another order, interleaved and/or combined. The magnetic recording transducer being fabricated may be part of a merged head that also includes a read head (not shown) and resides on a slider (not shown) in a disk drive. The method 200 is also described in the context of providing a single magnetic recording transducer. However, the method 200 may be used to fabricate multiple transducers at substantially the same time. The method 200 and system are also described in the context of particular layers. However, in some embodiments, such layers may include multiple sub-layers. The method 300 also may commence after formation of other portions of the transducer.

The first pole 190 is optionally provided, via step 202. In some embodiments, step 202 includes forming the pedestal 191 for the first pole 190. An insulator may also be provided on the first pole. The waveguide 140 may be provided, via step 204. Step 204 generally includes forming cladding layers surrounding a core layer. An NFT 144 may optionally be provided, via step 206. The NFT 144 is typically a metal such as gold and may include multiple substeps.

The heat sink 180 and/or heat spreader 182 are optionally provided, via step 208. Step 208 may include depositing and patterning high thermal conductivity material(s), such as Cu.

The main pole 160 is provided, via step 210. Step 210 includes ensuring that the main pole 160 is recessed from the ABS. Step 210 typically includes multiple deposition, masking and removal steps. Formation of the leading surface 166 (including bevel 169, NFT-facing surface 167 and, optionally, portion 168), ABS-facing surface 164 and trailing bevel 162 may also be completed as part of step 210.

One or both of the auxiliary pole(s) 170 and/or 172 are formed, via step 212. Step 212 is performed such that the auxiliary pole(s) 170 and/or 172 are recessed further form the ABS than the width of the portion of the waveguide 144 at the ABS. The auxiliary pole(s) 170 and/or 172 are also recessed further from the ABS than the main pole 160/260. The coil(s) 150/150' may be provided, via step 214. Step 214 may include multiple depositing and patterning steps such that the turns on both sides of the main pole 160 are fabricated. The shield 192 may also be fabricated, via step 216. Step 216 may include manufacturing the pedestal 193. Fabrication of the transducer may then be completed, via step 218.

Using the method 200, the HAMR transducer 130, 130', 130" and/or 130''' may be fabricated. The benefit(s) of one or more of the HAMR transducer(s) 130, 130', 130" and/or 130''' may thus be achieved.

We claim:

1. A heat assisted magnetic recording (HAMR) write transducer coupled with a laser for providing energy and having an air-bearing surface (ABS) configured to reside in proximity to a media during use, the HAMR transducer comprising:
a main pole configured to write to a region of the media, the main pole being recessed from the ABS by a first distance, the main pole including a bottom surface and a top surface opposite to the bottom surface, the bottom surface having a sloped portion that is sloped at an angle from perpendicular to the ABS, the angle being greater than zero degrees and less than ninety degrees;
at least one additional pole adjacent to the main pole in a down track direction, the additional pole being recessed from the ABS by a second distance greater than the first distance;
a waveguide optically coupled with the laser and directing a portion of the energy toward the ABS at an acute angle from the ABS, a portion of the waveguide residing between the at least one additional pole and the ABS, the bottom surface of the main pole being closer to the waveguide than the top surface of the main pole is; and
at least one coil for energizing the main pole.

2. The HAMR write transducer of claim 1 wherein the first distance is at least thirty nanometers and not more than one hundred fifty nanometers.

3. The HAMR write transducer of claim 1 wherein the first distance is at least fifty nanometers.

4. The HAMR write transducer of claim 1 wherein the waveguide has a width at the ABS and wherein the second distance is at least as large as the width.

5. The HAMR write transducer of claim 1 wherein the waveguide is an interferometric waveguide including a plurality of arms, the energy from the laser being split between the plurality of arms and directed toward the ABS, the plurality of arms forming the angle with the ABS.

6. The HAMR write transducer of claim 1 wherein the at least one coil carries current in a first direction on a first side of the main pole and in a second direction on a second side of the main pole, the first side being opposite to the second side, the first direction being opposite to the second direction.

7. The HAMR write transducer of claim 1 wherein the at least one additional pole includes a first additional pole and a second additional pole, the main pole being between the first additional pole and the second additional pole.

8. The HAMR write transducer of claim 7 wherein the first additional pole and the second additional pole each adjoin the main pole.

9. The HAMR write transducer of claim 1 wherein the main pole includes a beveled surface and an ABS facing surface adjoining the beveled surface, the beveled surface forming a bevel angle with the ABS, the bevel angle being less than ninety degrees, the beveled surface being part of the top surface.

10. The HAMR write transducer of claim 1 further comprising:
a near-field transducer (NFT), a portion of the NFT residing at the ABS, a first portion of the energy from the laser traveling through the waveguide such that the NFT couples a second portion of the energy from the laser to the media.

11. The HAMR write transducer of claim 10 wherein the NFT extends a third distance from the ABS, the third distance being greater than the first distance.

12. The HAMR write transducer of claim 10 wherein the NFT extends a third distance from the ABS, the third distance being not greater than the first distance.

13. The HAMR write transducer of claim 1 further comprising:
a first pole having a pedestal, a portion of the pedestal residing at the ABS.

14. The HAMR write transducer of claim 13 further comprising:
a shield having a shield pedestal, a portion of the shield pedestal residing at the ABS, the main pole residing between the shield and the first pole.

15. A HAMR write transducer coupled with a laser for providing energy and having an air-bearing surface (ABS) configured to reside in proximity to a media during use, the HAMR transducer comprising:
a main pole configured to write to a region of the media, the main pole being recessed from the ABS by a first distance, having a beveled surface and an ABS-facing surface adjoining the beveled surface, the beveled surface forming a bevel angle with the ABS, the bevel angle being less than ninety degrees, the first distance being at least fifty nanometers and not more than one hundred fifty nanometers;
at least one additional pole adjacent to the main pole in a down track direction, the additional pole being recessed from the ABS by a second distance greater than the first distance;
an interferometric waveguide optically coupled with the laser and having a plurality of arms for directing a portion of the energy toward the ABS at an acute angle from the ABS, a portion of the waveguide having a width and residing between the at least one additional pole and the ABS, the second distance being at least as large as the width;
at least one coil for energizing the main pole, the at least one coil carrying current in a first direction on a first side of the main pole and in a second direction on a second side of the main pole, the first side being opposite to the second side, the first direction being opposite to the second direction;
a near-field transducer (NFT), a portion of the NFT residing at the ABS, a first portion of the energy from the laser traveling through the waveguide such that the NFT couples a second portion of the energy from the laser to the media;
a heat sink adjacent to the NFT and a first portion of the main pole;
a heat spreader adjoining a portion of the heat sink and a second portion of the main pole;
a first pole having a pedestal, a portion of the pedestal residing at the ABS; and
a shield having a shield pedestal, a portion of the shield pedestal residing at the ABS, the main pole residing between the shield and the first pole.

16. A heat assisted magnetic recording (HAMR) disk drive comprising:

a media,
a slider,
a laser for providing energy; and
a HAMR write transducer coupled with the slider, the HAMR write transducer having air-bearing surface (ABS), a main pole, at least one additional pole, a waveguide and at least one coil, the main pole being configured to write to a region of the media, the main pole being recessed from the ABS by a first distance, the main pole including a bottom surface and a top surface opposite to the bottom surface, the bottom surface having a sloped portion that is sloped at an angle from perpendicular to the ABS, the angle being greater than zero degrees and less than ninety degrees, the bottom surface being closer to the waveguide than the to surface is, the at least one additional pole adjacent to the main pole in a down track direction, the additional pole being recessed from the ABS by a second distance greater than the first distance, the waveguide being optically coupled with the laser and directing a portion of the energy toward the ABS at an acute angle from the ABS, a portion of the waveguide residing between the at least one additional pole and the ABS, the at least one coil for energizing the main pole.

17. A method for fabricating a heat assisted magnetic recording (HAMR) write transducer coupled with a laser for providing energy and having an air-bearing surface (ABS) configured to reside in proximity to a media during use, the method comprising:
providing a main pole configured to write to a region of the media, the main pole being recessed from the ABS by a first distance, the main pole including a bottom surface and a top surface opposite to the bottom surface, the bottom surface having a sloped portion that is sloped at an angle from perpendicular to the ABS, the angle being greater than zero degrees and less than ninety degrees;
providing at least one additional pole adjacent to the main pole in a down track direction, the additional pole being recessed from the ABS by a second distance greater than the first distance;
providing a waveguide optically coupled with the laser and directing a portion of the energy toward the ABS at an acute angle from the ABS, a portion of the waveguide residing between the at least one additional pole and the ABS, the bottom surface of the main pole being closer to the waveguide than the top surface is; and
providing at least one coil for energizing the main pole.

18. The method of claim 17 wherein the first distance is at least thirty nanometers and not more than one hundred fifty nanometers.

19. The method of claim 17 wherein the waveguide has a width at the ABS and wherein the second distance is at least as large as the width.

20. The method of claim 17 wherein the waveguide is an interferometric waveguide including a plurality of arms, the energy from the laser being split between the plurality of arms and directed toward the ABS, the plurality of arms forming the angle with the ABS.

21. The method of claim 17 wherein the at least one coil carries current in a first direction on a first side of the main pole and in a second direction on a second side of the main pole, the first side being opposite to the second side, the first direction being opposite to the second direction.

22. The method of claim 17 wherein the step of providing the main pole further includes:
providing a beveled surface and an ABS facing surface adjoining the beveled surface, the beveled surface forming a bevel angle with the ABS, the bevel angle being less than ninety degrees, the beveled surface being part of the to surface.

23. The method of claim 17 further comprising:
providing a near-field transducer (NFT), a portion of the NFT residing at the ABS, a first portion of the energy from the laser traveling through the waveguide such that the NFT couples a second portion of the energy from the laser to the media.

24. The method of claim 23 wherein the NFT extends a third distance from the ABS, the third distance being greater than the first distance.

25. The method of claim 23 wherein the NFT extends a third distance from the ABS, the third distance being not greater than the first distance.

26. The method of claim 17 further comprising:
providing a first pole having a pedestal, a portion of the pedestal residing at the ABS; and
providing a shield having a shield pedestal, a portion of the shield pedestal residing at the ABS, the main pole residing between the shield and the first pole.

27. The HAMR write transducer of claim 1 further comprising:
a heat spreader adjoining a first portion of the bottom surface of the main pole; and
a heat sink adjoining a second portion of the bottom surface of the main pole and a portion of the heat spreader.

28. The method of claim 17 further comprising:
providing a heat spreader adjoining a first portion of the bottom surface of the main pole; and
providing a heat sink adjoining a second portion of the bottom surface of the main pole and a portion of the heat spreader.

* * * * *